(12) United States Patent
Don et al.

(10) Patent No.: US 7,673,115 B1
(45) Date of Patent: Mar. 2, 2010

(54) DATA OPERATION VALIDATION

(75) Inventors: Arieh Don, Newton, MA (US); Terry Seto Lee, Arcadia, CA (US); Alexandr Veprinsky, Brookline, MA (US); Xiali He, South Grafton, MA (US)

(73) Assignee: EMC Corporation, Hopkinton, MA (US)

( * ) Notice: Subject to any disclaimer, the term of this patent is extended or adjusted under 35 U.S.C. 154(b) by 199 days.

(21) Appl. No.: 11/229,976

(22) Filed: Sep. 19, 2005

(51) Int. Cl.
*G06F 12/00* (2006.01)
*G06F 13/00* (2006.01)
*G06F 13/28* (2006.01)
*G06F 9/26* (2006.01)
*G06F 9/34* (2006.01)

(52) U.S. Cl. .................. 711/201; 711/163; 711/164; 711/165; 711/170; 711/171; 711/172; 711/173; 711/200

(58) Field of Classification Search ......... 711/200–201, 711/170–173, 163–165
See application file for complete search history.

(56) References Cited

U.S. PATENT DOCUMENTS

| | | | |
|---|---|---|---|
| 5,206,939 A | 4/1993 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 6,003,134 A * | 12/1999 | Kuo et al. | 726/20 |
| 6,289,428 B1 * | 9/2001 | Derrick et al. | 711/201 |
| 6,564,219 B1 * | 5/2003 | Lee et al. | 707/100 |
| 2001/0016887 A1 * | 8/2001 | Toombs et al. | 710/102 |
| 2002/0174317 A1 * | 11/2002 | Schroeder | 711/201 |

OTHER PUBLICATIONS

U.S. Appl. No. 10/749,692, filed Dec. 29, 2003.

* cited by examiner

*Primary Examiner*—Sanjiv Shah
*Assistant Examiner*—Yaima Campos
(74) *Attorney, Agent, or Firm*—Muirhead and Saturnelli, LLC (57) ABSTRACT

Described are techniques for processing a data operation. A data operation is received at a data storage system. The data operation requests a modification of data stored in the data storage system. A first address is obtained that represents a starting address of the data operation. A calculation is performed representing a boundary condition of the starting address of the data operation. Based on the calculation, it is determined whether the data operation has a starting address which is properly aligned.

16 Claims, 9 Drawing Sheets

DATA OPERATION VALIDATION

BACKGROUND

1. Technical Field

This application generally relates to a data storage system, and more particularly to techniques used with data operations in a data storage system.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. Nos. 5,206,939 to Yanai et al., 5,778,394 to Galtzur et al., U.S. Pat. No. 5,845,147 to Vishlitzky et al., and U.S. Patent No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

A data operation, such a write operation, may be received by a data storage system. Qualification processing may be performed to determine if a received data operation is a valid operation prior to modifying the data on the physical device in accordance with a received write operation. Such qualification processing may be performed as part of maintaining data integrity. A valid data operation, for example, may be a write operation from a database application executing on a host. An invalid data operation may be a write operation, for example, issued from a virus or other form of malicious code, or may otherwise be a malformed write operation.

Thus, it may be desirable to perform qualification processing which efficiently utilizes resources of a data storage system minimizing the adverse impact in connection with performing other data storage system operations.

SUMMARY OF THE INVENTION

In accordance with one aspect of the invention is a method for processing a data operation comprising: receiving, at a data storage system, a data operation requesting a modification of data stored in the data storage system; obtaining a first address representing a starting address of the data operation; performing a calculation representing a boundary condition of the starting address of the data operation; and determining, based on said calculation, whether said data operation has a starting address which is properly aligned. The method may also include performing said data operation if said data operation has a starting address which is properly aligned, the data operation may be performed if said data operation is in accordance with one or more criteria, said one or more criteria including proper alignment of said starting address of said data operation. The data operation may be a write operation issued by a host. The write operation may be issued by a database application executing on the host. The steps of performing and determining may be performed by a component included in the data storage system receiving said data operation from said host upon receipt of said data operation. The data operation may be a write operation directed to a logical device, said logical device including one or more extents of data of the database, each of said extents beginning at a second address on the logical device, each of said extents including one or more records of a record size, said calculation being represented as the remainder obtained when a first quantity, (first address−second address), is divided by the record size. If the remainder is zero, said data operation may be determined to have a starting address which is properly aligned, and the method may further comprise performing said data operation. If the remainder is non-zero, said data operation may be determined to have a starting address which is not properly aligned, and the method may further comprise: determining whether to perform said data operation in accordance with a flag setting and said remainder; and generating an error condition. The flag setting may indicate that said data operation should not proceed when said remainder is non-zero. The error condition may be reported to the database application. The second address and said record size may be stored in an extent table associated with the logical device, said extent table being stored in the data storage system.

In accordance with another aspect of the invention is a computer program product for processing a data operation comprising code that: receives, at a data storage system, a data operation requesting a modification of data stored in the data storage system; obtains a first address representing a starting address of the data operation; perform a calculation representing a boundary condition of the starting address of the data operation; and determines, based on said calculation, whether said data operation has a starting address which is properly aligned. The computer program product may also include code that: performs said data operation if said data operation has a starting address which is properly aligned. the data operation may be performed if said data operation is in accordance with one or more criteria, said one or more criteria including proper alignment of said starting address of said data operation. The write operation may be issued by a database application executing on a host. The steps of performing and determining may be performed by a component included in the data storage system receiving said data operation from said host upon receipt of said data operation. The data operation may be a write operation directed to a logical device, said logical device including one or more extents of data of the database, each of said extents beginning at a second address on the logical device, each of said extents including one or more records of a record size, said calculation being represented as the remainder obtained when a first quantity, (first address−second address), is divided by the record size. The second address and said record size may be stored in an extent table associated with the logical device, said extent table being stored in the data storage system.

In accordance with another aspect of the invention is a data storage system comprising: a first component in communication with a host, the first component including a processor and comprising code that: receives a data operation requesting a modification of data stored in a database included in the data storage system; obtains a first address representing a starting address of the data operation; performs a calculation representing a boundary condition of the starting address of the data operation; and determines, based on said calculation, whether said data operation has a starting address which is properly aligned; and global memory used by said first component and other components in the data storage system, said global memory including an extent table of one or more extent entries, each of said entries being associated with an extent of data of the database, said extent table being associated with a logical device to which said data operation is directed, said logical device including one or more extents of data of the database.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF
EMBODIMENT(S)

Figure 1:
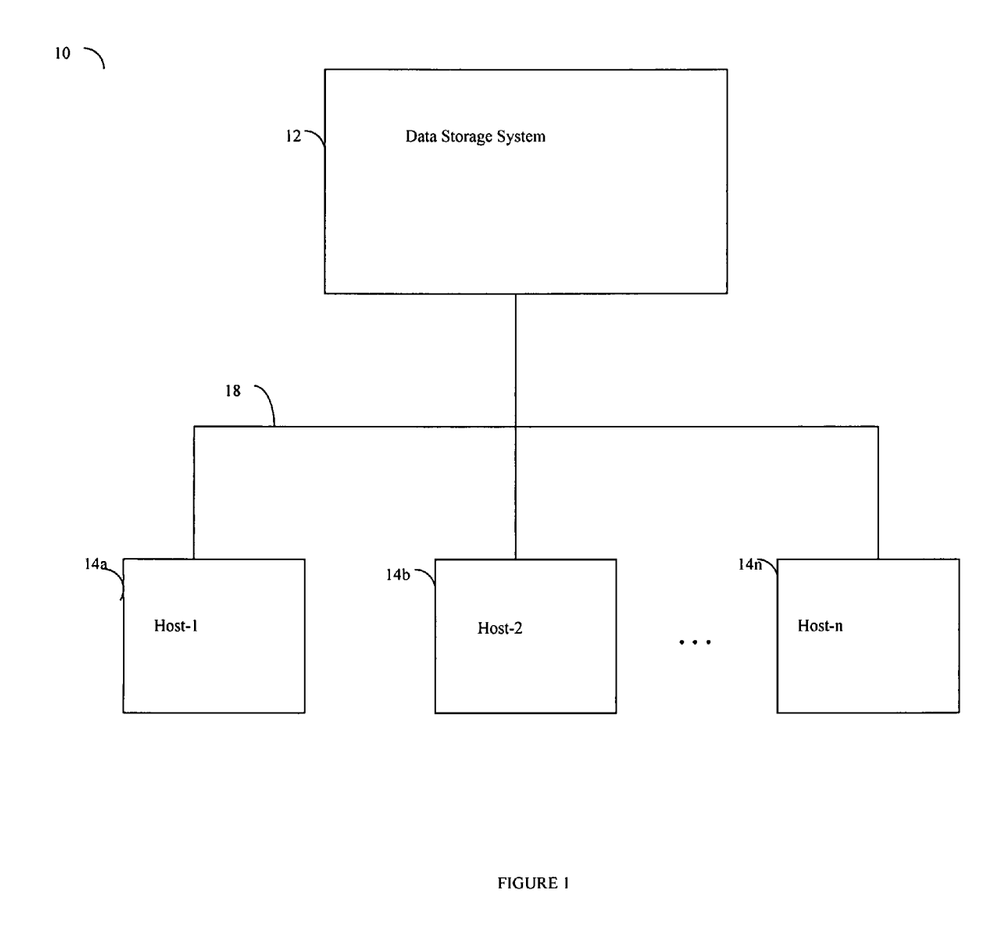
FIG. 1 is an example of an embodiment of a computer system that may utilize the techniques described herein.

Referring now to FIG. 1, shown is an example of an embodiment of a computer system that may be used in performing the techniques described herein. The computer system 10 includes a data storage system 12 connected to host systems 14a-14n through communication medium 18. In this embodiment of the computer system 10 and the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the computer system 10.

Each of the host systems 14a-14n and the data storage system 12 included in the computer system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, Fibre Channel, or iSCSI, and the like. Some or all of the connections by which the hosts and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
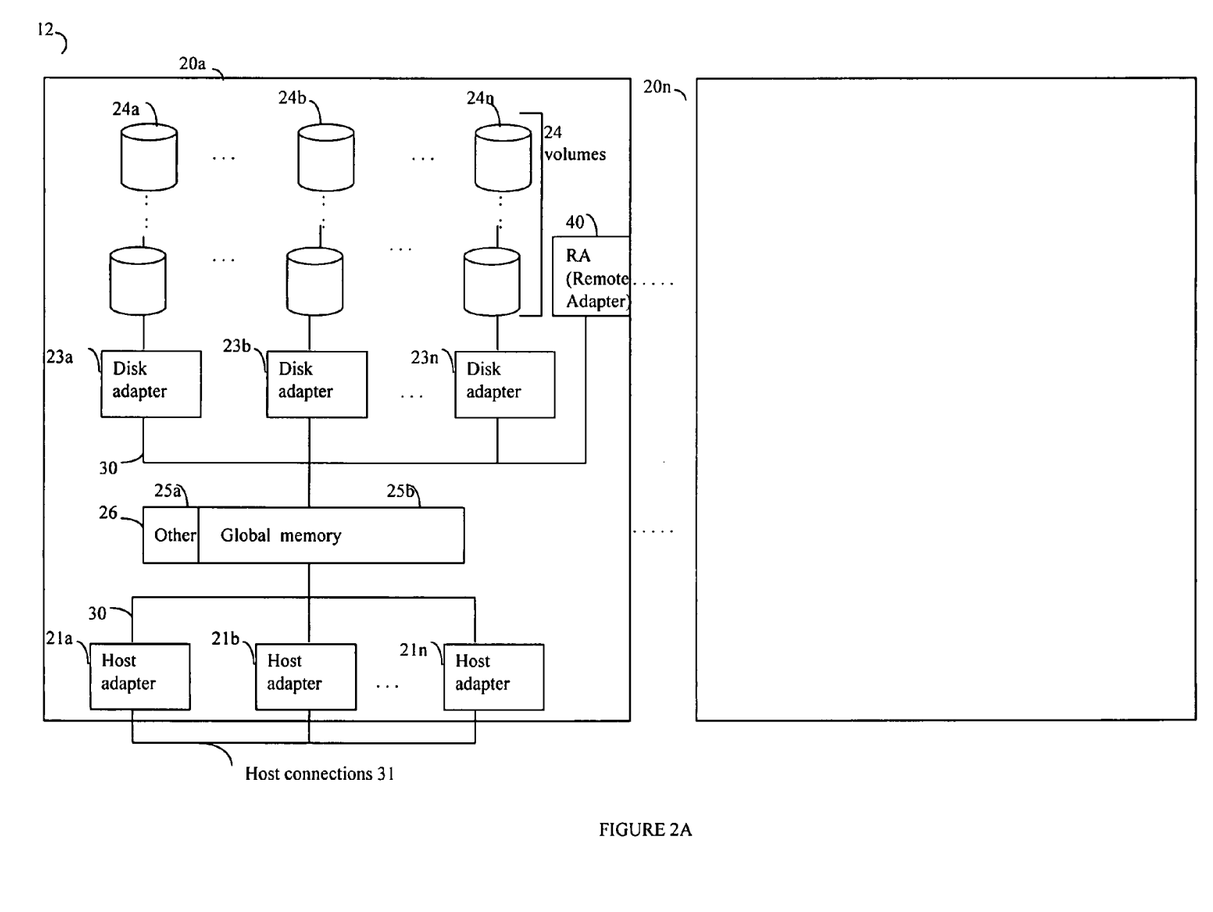
FIG. 2A is an example of an embodiment of a data storage system.

Referring now to FIG. 2A, shown is an example of an embodiment of the data storage system 12 that may be included in the computer system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the computer system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a.

The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

One or more internal logical communication paths may exist between the DA's, the RA's, the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. In the following description, data residing on an LV may be accessed by the DA following a data request in connection with I/O operations that other directors originate.

Figure 2B:
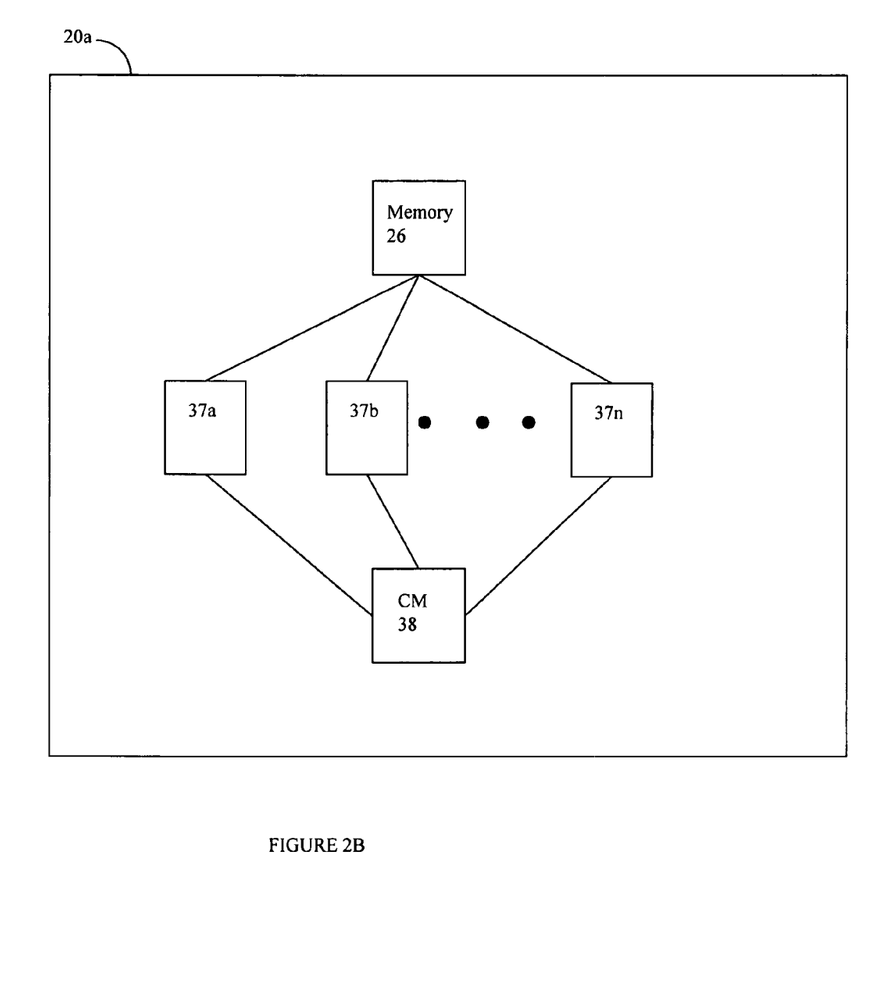
FIG. 2B is a representation of the logical internal communications between the directors and memory included in one embodiment of data storage system of FIG. 2A.

Referring now to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary.

The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

Figure 3:
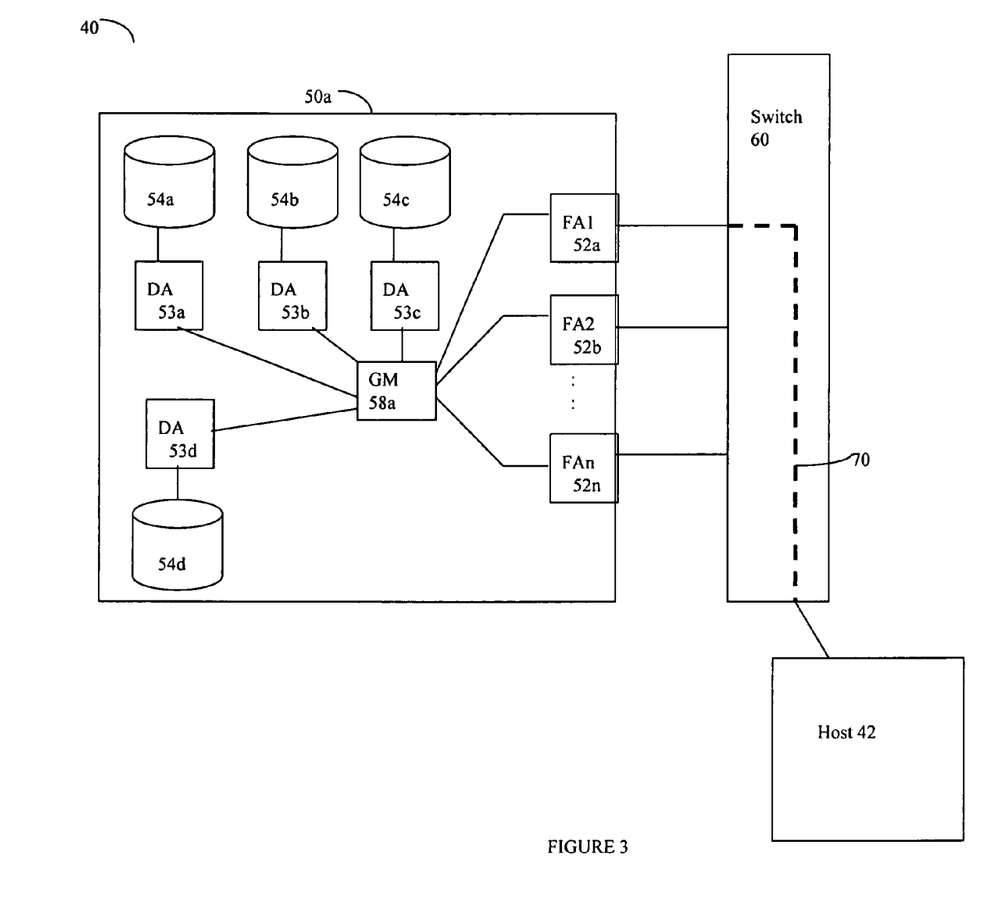
FIG. 3 is another more detailed example of an embodiment of a computer system that may utilize the techniques described herein.

Referring now to FIG. 3, shown is an example of an embodiment of a computer system 40 that may be used in connection with the techniques described herein. It should be noted that the embodiment illustrated in FIG. 3 presents a simplified view of some of the components of a computer system as generally illustrated in FIGS. 1 and 2A, for example, including only some detail of the data storage system 50a for the sake of illustration.

Included in the system 40 is data storage system 50a, a switch 60 and a host 42. The data storage system 50a and the host 42 may communicate using switch 60. In this example, the data storage system 50a includes data storage devices 54a-54d, DAs 53a-53d, global memory (GM) 58a, and multiple Fibre Channel Adapters (FAs) 52a-52n. Each of the FAs 52a-52n has a Fibre Channel connection to the switch 60 to facilitate communications with the host 42. The host 42 may issue a command in the form of a request to perform a data operation to data storage system 50a through switch 60 over path 70 to one of the FAs 52a-52n. It should be noted that although an FA is illustrated herein as facilitating host communications, other types of directors may be included in an embodiment in connection with facilitating such communications between the host and the data storage system.

A request may be issued from the host 42 to perform a data operation, such as a write operation, to a device on the data storage system 50a. For example, a database application executing on the host may issue a request to perform a data operation, such as write operation, to write data to a device, such as device 54a. Devices, such as 54a-54c may refer to logical devices of the data storage system. As described elsewhere herein, each of the logical devices may correspond to one or more physical devices, or a portion of a physical device. Upon receipt of the write operation, processing may be performed by the data storage system 50a in connection with qualifying or otherwise validating the write operation. One or more different types of tests may be performed on the received data operation by the data storage system 50a. In the embodiment illustrated herein, as will be described in more detail in following paragraphs, the FA or other component interfacing with the host and receiving the data operation may perform one or more qualification tests in connection with determining whether the data operation is valid. A data operation, such as a write operation, received by the data storage system 50a may be valid, for example, if the data operation meets one or more criteria in accordance with one or more qualification tests. A valid data operation may be issued, for example, by a database application executing on the host. An invalid data operation may be a data operation that fails to meet one or more criteria of the one or more qualification tests. An invalid data operation may be issued, for example, by a virus or other form of malicious code. An invalid data operation may also be issued, for example, by the database application executing on the host. This invalid data operation may be, for example, a malformed write operation caused by a coding error, corruption of the data operation, and the like. One or more qualification tests may be performed by the data storage system upon receipt of a data operation prior to allowing the data operation to proceed, for example, resulting in modification of data on a data storage device.

With reference to FIG. 3 as mentioned above, the data operation may be issued from the host 42 to the data storage system 50a. The host may communicate with FA 1 52a. FA 1 52a may execute code to perform one or more qualification tests. The FAs may also communicate as needed with the DAs and other components in the data storage system. For example, the FAs may issue one or more commands to DAs as needed in performing the data operation. When the FA 1 52a receives the command to perform data operation from the host, the FA 1 52a stores the command in processor local memory, and may perform one or more qualification tests on the command portion of the data operation. If these qualification tests are successful, related data for the write operation may then be received from the host and stored in GM. Additionally, one or more qualification tests may also be performed on the related data. The qualification test described in more detail herein may performed on the command portion of the data operation and may be performed alone, or in combination with, one or more other qualification tests on the command and related data portions of the data operation.

Although the techniques described herein in following paragraphs are illustrated with respect to particular examples, it will be appreciated by those skilled in the art that the techniques described herein may be used in connection with other embodiments and variations.

In the embodiment described in following paragraphs, a database application may issue the data operation, such as a write operation, to the data storage system. The structured data of the database may be stored on one or more of the devices of the data storage system. Each of the devices may be partitioned into units, such as blocks, of a size in accordance with the particular embodiment. Each record of the database as stored on these devices may have a record size which is one or more blocks. For example, in one embodiment, each block may be 512 bytes, and the database record size may be 4 blocks or 2K bytes. The particular format, sizes, and the like, may vary with each particular database.

Figure 4:
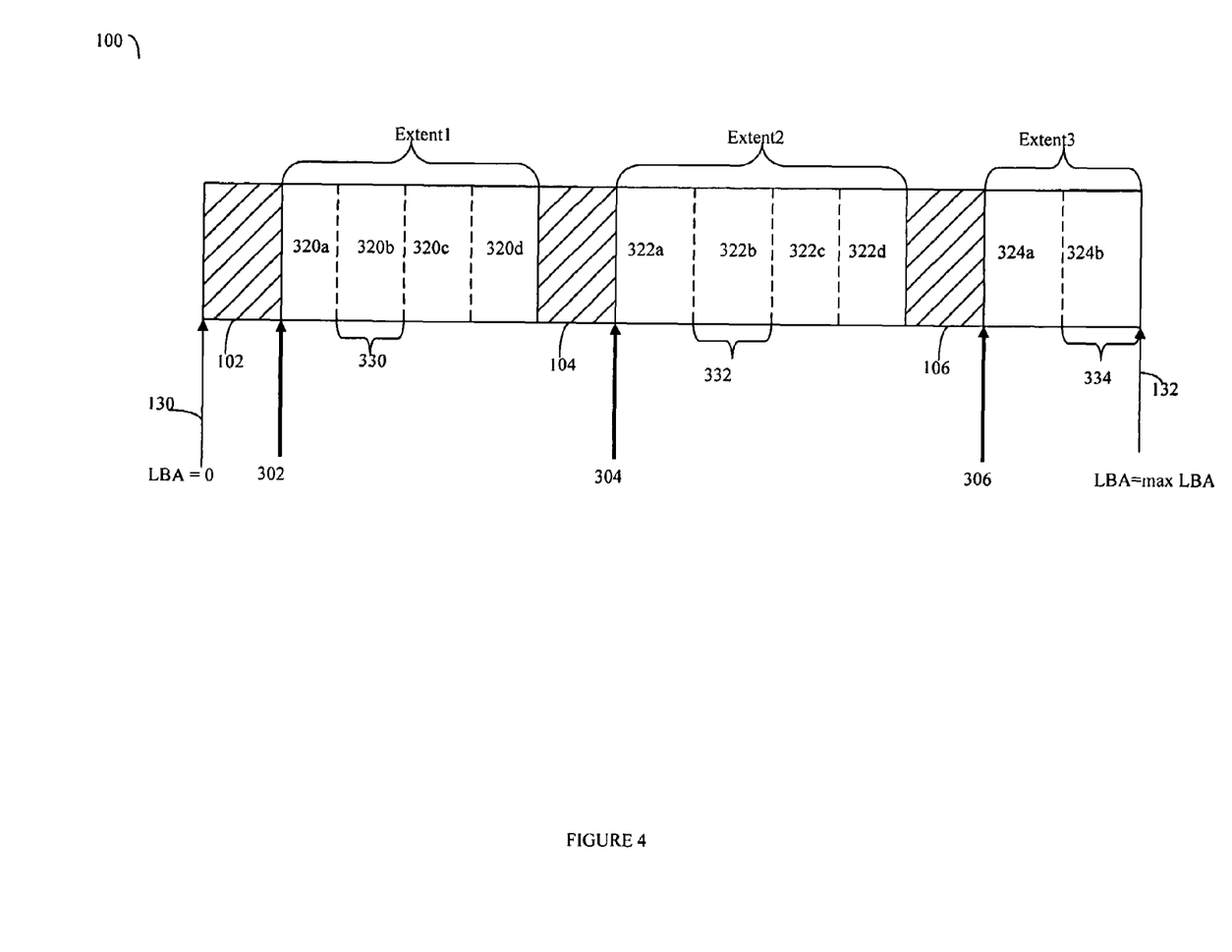
FIG. 4 is an example illustrating a structure layout of data on a device as may used in connection with a database.

Referring now to FIG. 4, shown is an example 100 illustrating the structured layout of data on a device. The example 100 illustrates how data of a database may be stored in one or more partitions, or extents, on a logical device of a data storage system, such as 50a of FIG. 3. The example 100 illustrates one representation of data as may be included in the database on a device. The device may be a logical device referenced by logical block addresses or LBAs. The lowest LBA=0 is denoted by arrow 130. The highest LBA for the device in this example is denoted by arrow 132. The example 100 includes 3 extents upon which data from one or more databases is stored. The device illustrated in 100 also includes portions 102, 104 and 106 which may include other user data not included in the database being illustrated and described in this example. Techniques that may be used in connection with denoting which portions of the device are mapped into extents are described in following paragraphs.

It should be noted that each extent included in 100 starts at its own offset relative from the start of the device as indicated by 130. Extent 1 begins at the offset illustrated by 302. Extent 2 begins at the offset illustrated by 304. Extent 3 begins at the offset illustrated by 306. Each extent is further partitioned into one of more database records. The size of each record is in accordance with the record size of the particular database. For example, extent 1 includes database records 320a-320d. Extent 2 includes database records 322a-322d. Extent 3 includes database records 324a and 324b. Each of the extents 1-3 may be included in the same database, or one or more different databases. Accordingly, each extent may have a different record size as described elsewhere herein in more detail. For example, if each of the extents 1-3 is included in a different database, each of the extents may have a different database record size in accordance with the particular database.

In one embodiment, a database including one or more extents may be stored on one or more logical devices of the data storage system 50a. The data storage system may maintain information about the extents for each of the logical devices in an extent table. The data storage system may maintain one extent table for each such logical device. Information that may be included in an extent table is described in following paragraphs.

Figure 5:
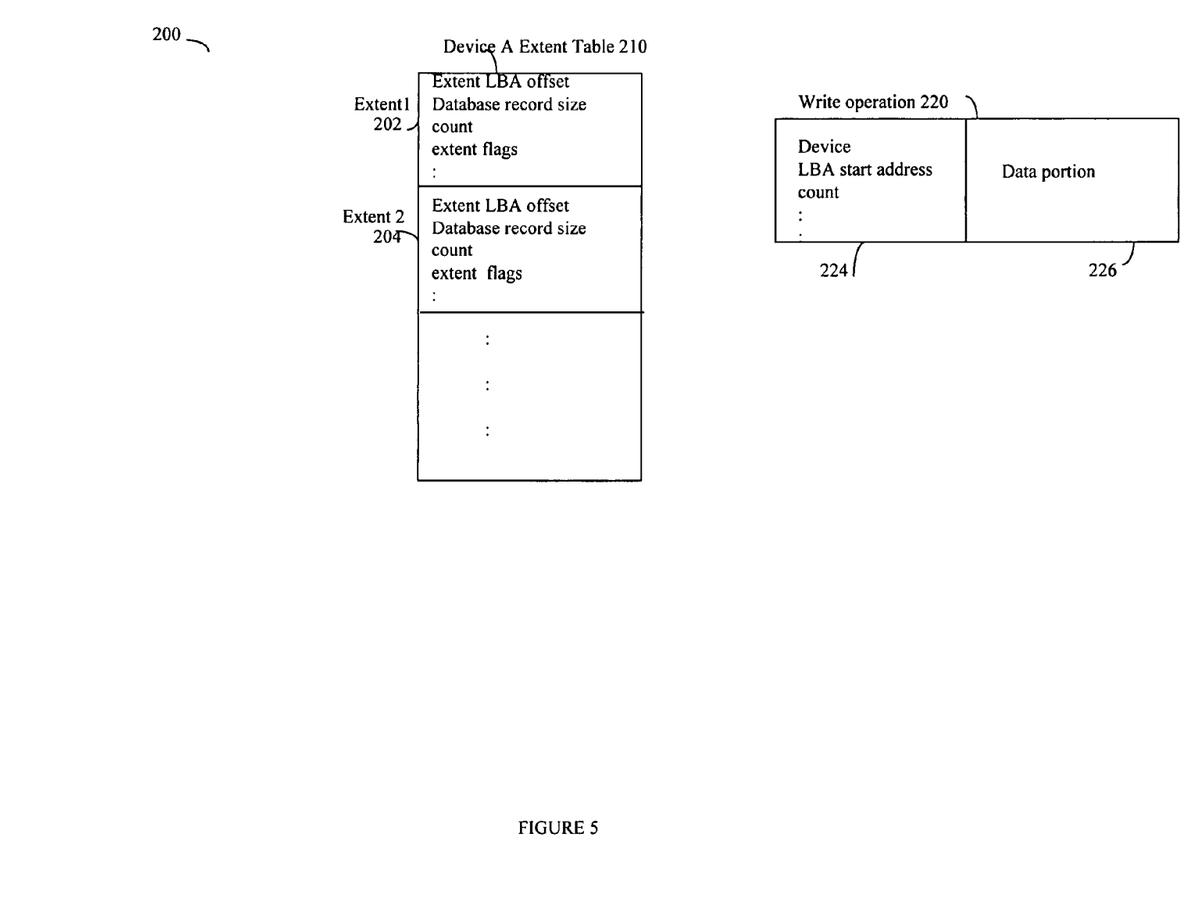
FIG. 5 is an example of data that may be used by the data storage system in connection with performing the techniques described herein for data operation qualification processing.

Referring now to FIG. 5, shown is an example 200 of data that may be used by the data storage system in connection with performing the techniques described herein. The example 200 includes Device A extent table 210 and a write operation 220. The table 210 is an example representation illustrating an extent table that may be used in connection with mapping extents to portions of a device, such as logical device A. Each logical device may have an associated extent table including information about mappings of extents for that particular device. An entry, such as 202 and 204, may be included in the table for each extent on the logical device. Each entry, such as 202, may include an extent LBA offset identifying the LBA offset at which that particular extent starts on the device. Each entry may also identify a database record size of each record included in that extent. Each entry may also include a count field, indicating the size of an extent associated with the particular entry, and an extent flags field, including flag values. In one embodiment, the extent flags field may include one or more bit flags. One of the bit flags may be set by the database application, as specified by the customer, to indicate whether I/O operations are to continue even if one or more qualification tests performed by the data storage system fail. Each entry may also include other information used in connection with the extents. In one embodiment, the table 210 may be stored in GM of the data storage system. The table 210 may then be copied locally to the FA for use in connection with performing processing utilizing information in the table, as described in more detail elsewhere herein.

An extent table may also include other information concerning the database. As an example, a first portion of the LBA address space of a logical device may be reserved for use in connection with a device label and other device information. As a result, the first extent of the database stored on a logical device may not begin at LBA 0 of the logical device and may begin at an LBA offset location that may be referred to as the "host offset".

If the table 210 of FIG. 5 represents data for the extents illustrated in 100 of FIG. 4, entry 202 includes information about extent 1. The extent LBA offset of entry 202 of FIG. 5 identifies the offset represented by arrow 302 of FIG. 4. Similarly, the extent LBA offset of entry 204 identifies the offset represented by arrow 304 of FIG. 4. The database record size of entry 202 of FIG. 5 identifies the size of a record such as illustrated by 330 of FIG. 4. Similarly, the database record size of entry 204 of FIG. 5 identifies the size of a record such as illustrated by 332 of FIG. 4.

The example 200 also includes a write operation 220 as may be received from the host in connection with a request to perform a write operation. The element 220 may represent the data included in a write operation as may be received from a database application executing on the host 42. In this example, the write operation 220 may include a first portion 224 and a second portion 226. The second portion 226 may include user data of the write operation, such as the new data to be written out to the physical device. The first portion 224 of the write operation 220 may include header data, write command data, and the like, as may be associated with the particular request or command format. The first portion 224 may include information about the write request such as, for example, a "device" field identifying the logical device upon which this write operation is performed, and an "LBA start address" field identifying the starting LBA of the write operation. The value of the LBA start address may be an absolute value between the minimum and maximum LBA range for a particular device, such as 0 and the max LBA as illustrated in FIG. 4. The first portion 224 may also include a "count" field identifying the amount of data to be written, or the size of the user data portion. In this example, the count may be an integer value representing a number of blocks or other unit of data to be written in connection with the write operation 220. In one embodiment, the command portion 224 may be received from the host and stored in memory local to the receiving FA of the data storage system. As described elsewhere herein, a first set of one or more qualification tests may be performed on the command portion of the write operation. The data portion 226 may subsequently be received from the host by the FA. The data portion 226 may be stored in GM and additional qualification tests performed on the data portion 226. The qualification test described herein, for example, in connection with FIG. 7 processing regarding alignment of the data operation's starting address, is performed utilizing the command portion 224 and does not require the data portion 226.

One or more qualification tests may be performed on the received write operation 220 from the database application. One or more of the criteria tested by the qualification tests may be in accordance with the structure and format of the database and/or the received write operation. One type of qualification test may examine certain values of the command portion 224 and/or the data portion 226 of the received write operation 220. For example, a database application executing on the host may set certain bits or other flags in connection with a write operation. These bits or other flags, as may be included in a data portion of 226 of the write operation, may be examined to determine if the values are as expected in connection with a valid or properly formed write operation. Utilizing the command portion 224, a check may also be performed on the LBA start address to ensure that it is within the expected range of LBA addresses for this particular device. Tests can also be made to ensure that the target locations being written to in connection with a received write operation are valid. For example, one or more tests may be performed to ensure that data is only written to portions of the device which are included in the database extents. For example, with reference to FIG. 3, checks can be made to ensure that no data is written to portions 102, 104 and 106. A test can be performed to ensure that the length of data for the I/O operation, such as the write operation, is of a proper length such as a multiple of a record size.

One qualification test that may be performed includes verifying that the write operation starts on a proper record boundary. In other words, with reference to 220 of FIG. 5, processing may be performed to determine whether a received write operation references an LBA start address that is a multiple of a database record size. This type of qualification test may be used to ensure that a write operation does not start writing data to an invalid location, such as the middle or other non-boundary location of a database record. As described herein, this qualification test utilizes the command portion 224.

Figure 6:
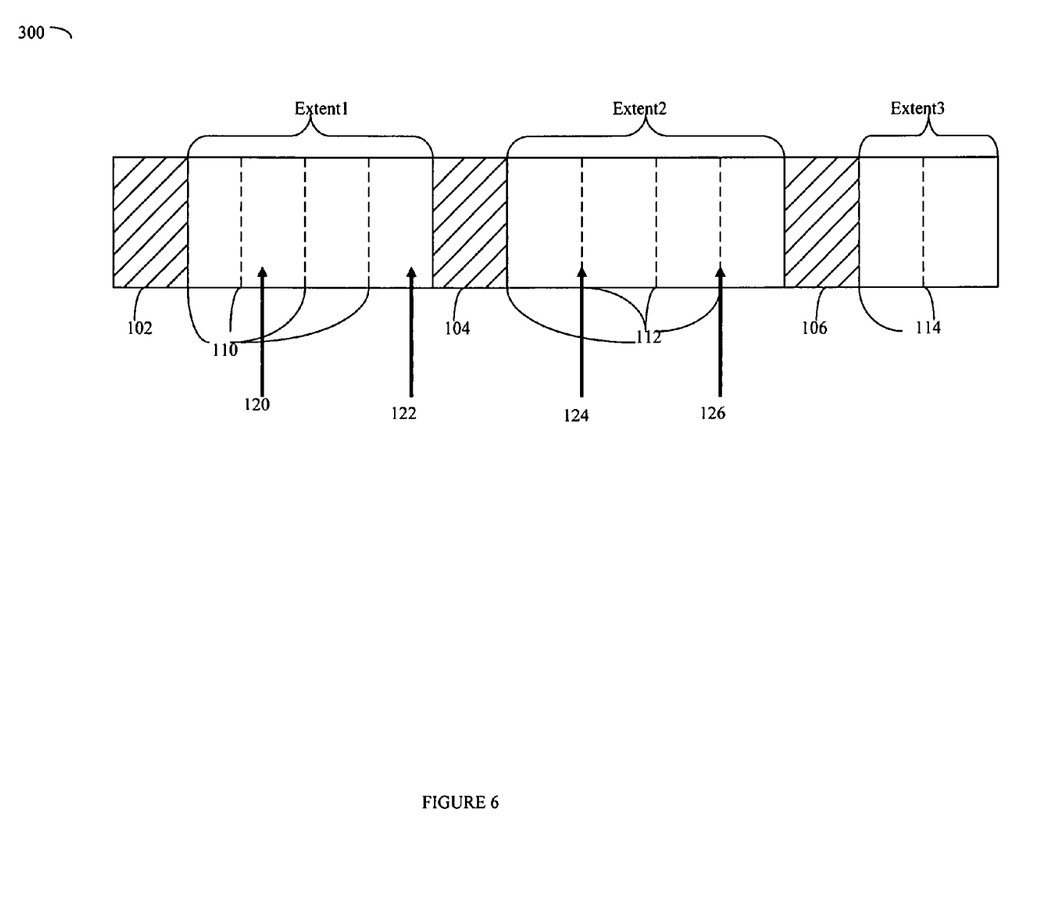
FIG. 6 is an example illustrating database record boundaries and starting addresses of write operations.

Referring now to FIG. 6, shown is an example 300 illustrating database record boundaries and starting addresses of write operations. The example 300 includes boundaries 110 identifying database record boundaries of extent 1 which may be considered valid starting addresses for write operations. Similarly, boundaries 112 are database record boundaries of extent 2 which may be considered valid starting addresses for write operations. Boundaries 114 are database record boundaries of extent 3 which may be considered valid starting addresses for write operations. If the LBA start address of the write operation is, for example, 124 or 126, the LBA start address is valid and passes this particular qualification test. If the LBA start address of the write operation is, for example, 120 or 122, the LBA start address is not valid and does not pass the qualification test.

In order to determine whether a write operation starts on a proper record boundary, data from the appropriate extent table and write operation may be read from global memory to perform the following calculation:

(LBA starts address−extent LBA offset) MOD (database record size)

where:

MOD is the mathematical modulus function resulting in a remainder;

LBA start address is the start address of the write operation as included in the received write operation;

extent LBA offset is the starting offset of the particular extent which is the target of the write operation; and database record size is the size of each database record for this extent.

If the result of the above-referenced calculation is zero (0), the associated write operation starts on a record boundary and passes this particular qualification test. Otherwise, if the result is non-zero, the associated write operation does not start on a record boundary and does not pass this particular qualification test.

It should be noted that an embodiment may perform any one or more different types of qualification tests. For example, the qualification test described herein to verify that the write operation starts on a proper record boundary may be performed alone, or in combination with, other qualification tests in hardware and/or software.

Figure 7:
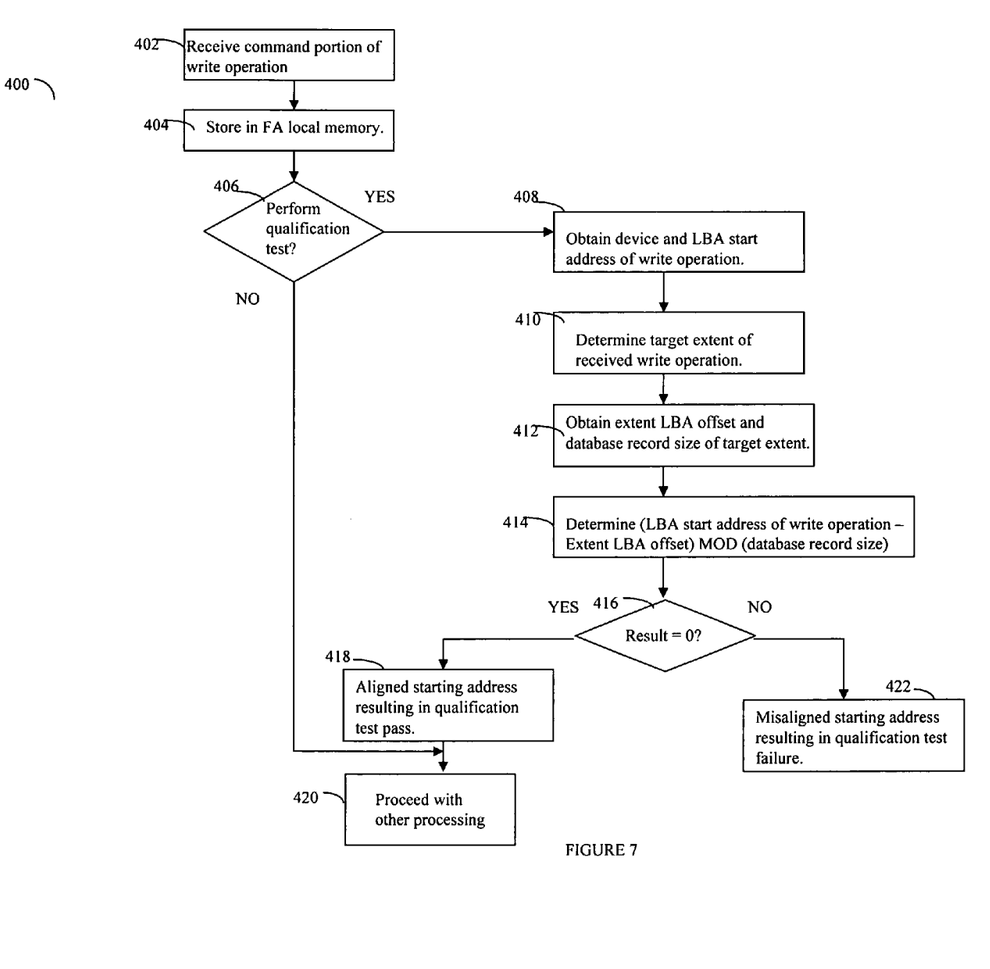
FIG. 7 is a flowchart of processing steps that may be performed in an embodiment in connection with performing a qualification test on a received data operation.

Referring now to FIG. 7, shown is a flowchart 400 of processing steps that may be performed in an embodiment in connection with the techniques described herein for performing a qualification test on a received data operation. In this example, the received data operation may be a write operation as described above. The steps of flowchart 400 summarize processing steps that may be performed in an embodiment utilizing the extent table stored in GM and the command portion of the write operation as may be stored in processor local memory as described above. The steps of flowchart 400 may be performed in an embodiment such as illustrated in FIG. 3 using a processor included in the FA, such as FA 1 52a, or other director receiving a data operation from the host, such as host 42 of FIG. 3.

At step 402, the command portion of a write operation is received by the FA. At step 404, the FA stores the received command portion of the write operation in memory local to the receiving FA of the data storage system. At step 406, a determination is made as to whether one or more qualification tests as described herein should be performed. If not, control proceeds to step 420 to bypass qualification test processing as described herein and proceed with other processing. Other processing of step 420 may include, for example, performing other qualification tests, and the like. Otherwise, if step 406 evaluates to YES, control proceeds to step 408 to obtain the LBA start address and device from the command portion of the write operation. At step 410, the extent which is the target of the write operation is determined. In other words, it is determined within which extent the LBA start address (i.e., identifying the starting address of the write operation) falls. In the embodiment described herein, processing of step 410 may be performed by reading from GM information of the extent table for the logical device which is the target of the write operation. By examining the extent LBA offset of each entry (i.e., indicating the LBA offset at which each corresponding extent begins) and the count (i.e., indicating the size of the extent) in the appropriate extent table, a target extent for the received write operation may be determined.

The target extent including the starting location (LBA start address) of the received write operation may be identified by traversing the list of extent entries. Each entry in the extent table may be examined to determine if the LBA start address is included in the range defined by the extent's LBA offset (i.e., lower bound of the range) and count field value (i.e., upper bound of the range being the extent's "LBA offset+count").

The extent LBA offset and database record size for the target extent are obtained in step 412. The information used in step 412 is obtained from the extent entry corresponding to the target extent. In step 414, the following calculation is performed using the extent LBA offset and database record size of the target extent, as obtained in step 412, to obtain a remainder:

(LBA start address of write operation−Extent LBA offset) MOD (database record size)

At step 416, a determination is made as to whether the result of step 414 processing is zero (0). If so, control proceeds to step 418 where the starting address of the write operation is determined as being aligned on a record boundary indicating that the current qualification test is passed. Otherwise, if the result of step 414 processing is non-zero, control proceeds to step 422 where the starting address of the write operation is determined as not being on a record boundary indicating current qualification test failure. An embodiment may also perform other processing associated with this qualification test failure including, for example, reporting the qualification test failure status. This status may be returned, for example, back to the database application originating the write operation.

In connection with the calculation performed at step 414, the quantity:

(LBA start address of write operation−Extent LBA offset)

identifies a location within a database record at which the write operation begins. Subsequently dividing this quantity by the database record size produces a remainder. There is a non-zero remainder if the write operation does not start on a database record boundary.

Figure 8:
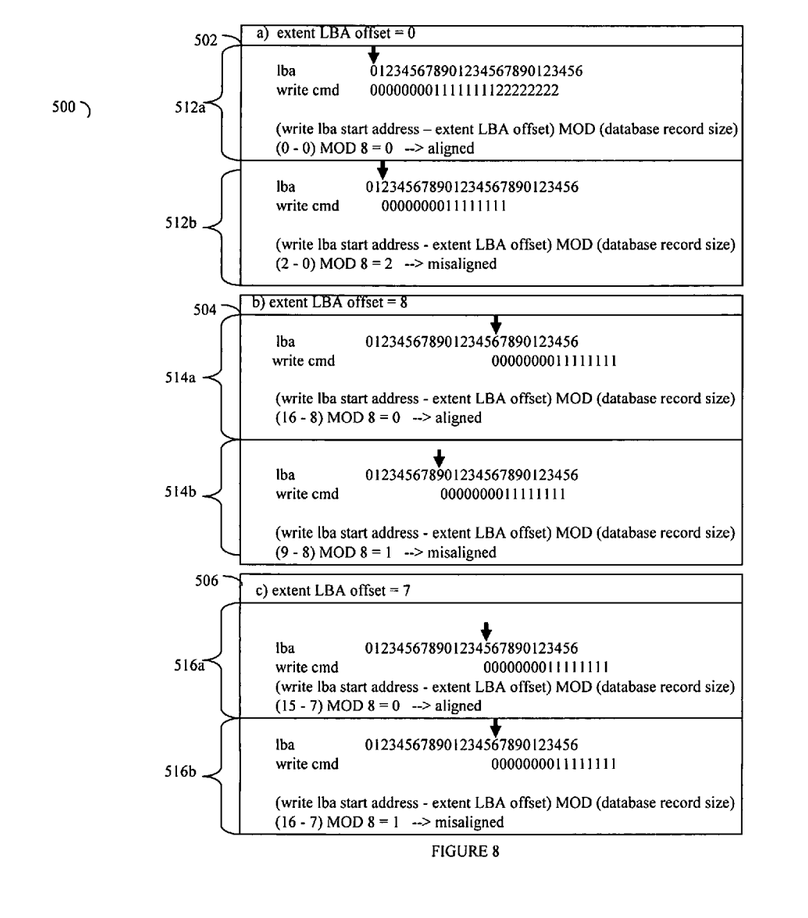
FIG. 8 includes sets of examples illustrating how the techniques described herein may be used in connection with performing qualification testing of received data operations.

Referring now to FIG. 8, shown are examples illustrating how the techniques described herein may be used in connection with performing a qualification test to determine data operations with misaligned starting addresses not on a proper record boundary. Included in 500 are three sets of examples, 502, 504, and 506, in which each set uses a different extent LBA offset. In other words, each set of examples has the target extent, which is the target of the write operation, begin at a different starting LBA. Each example utilizes a same database record size of 8. Each example also includes a first line labeled "lba" and a second line labeled "write cmd". The first line, "lba", represents the range of logical block addresses (LBAs) of the device to which the write operation is directed. The first line, "lba", is the same for each example and may be used as a reference for determining the starting LBA of the device for the write operation as illustrated in the second line labeled "write cmd". In each example, a downward arrow is included over the appropriate "lba" of the first line indicating the LBA (LBA start address) at which the write operation of the second line starts.

The first set of examples 502 has an extent LBA offset of 0. In other words, the write operation affects data of the database as included in the extent beginning at LBA offset 0. Element 512a includes a first example in which the write operation has a starting offset, or LBA start address, of 0 within the target extent. Performing the calculation as described herein, for example, as associated with step 414 processing of FIG. 7, results in a determination that the write operation is aligned since the remainder is 0. Element 512b includes a second example in which the write operation has a starting offset, or LBA start address, of 2 within the target extent. Performing the calculation as described herein, for example, as associated with step 414 processing of FIG. 7, results in a determination that the write operation is misaligned since the remainder is non-zero.

The second set of examples 504 has an extent LBA offset of 8. In other words, the write operation affects data of the database as included in the extent beginning at LBA offset 8. Element 514a includes a first example in which the write operation has a starting offset, or LBA start address, of 16 within the target extent. Performing the calculation as described herein, for example, as associated with step 414 processing of FIG. 7, results in a determination that the write operation is aligned since the remainder is 0. Element 514b includes a second example in which the write operation has a starting offset, or LBA start address, of 9 within the target extent. Performing the calculation as described herein, for example, as associated with step 414 processing of FIG. 7, results in a determination that the write operation is misaligned since the remainder is non-zero.

The third set of examples 506 has an extent LBA offset of 7. In other words, the write operation affects data of the database as included in the extent beginning at LBA offset 7. Element 516a includes a first example in which the write operation has a starting offset, or LBA start address, of 15 within the target extent. Performing the calculation as described herein, for example, as associated with step 414 processing of FIG. 7, results in a determination that the write operation is aligned since the remainder is 0. Element 516b includes a second example in which the write operation has a starting offset, or LBA start address, of 16 within the target extent. Performing the calculation as described herein, for example, as associated with step 414 processing of FIG. 7, results in a determination that the write operation is misaligned since the remainder is non-zero.

The foregoing qualification test of determining whether a received data operation, such as a write operation, is on a database record boundary and thus properly aligned. However, the foregoing test may be used in connection with testing other database and non-database boundary conditions.

Extent tables are described in more detail in pending U.S. patent application Ser. No. 10/749,692, as filed on Dec. 29, 2003, entitled DATA VERIFICATION FOLLOWING DATABASE WRITE, which is incorporated herein by reference. In one embodiment, the information included in the extent tables may be obtained in connection with database initialization. As part of database initialization, code executing on the host may query the database application and/or file system on the host to determine where the database and/or each file is stored on the data storage system. This information regarding where the database is stored on the data storage system (e.g., which portions of which logical devices) may then be communicated to the data storage system using system calls. The information may include the extent tables for the database which are stored in the GM of the data storage system as described herein.

The foregoing techniques may be used in connection with multiple record sizes and/or multiple block sizes that may vary with each extent and/or database. Additionally, the foregoing qualification test can be performed using the LBA start address of the command portion of the write operation without accessing additional data of the write operation, such as flags or other fields of the data portion of the write operation as may be included in GM.

In connection with performing I/O qualification tests, some vendors may incorporate performing one or more qualification tests into a special appliance or other component. This component may be attached to a port in communication with the data storage system to receive the I/O operation prior to reaching the data storage system. The incorporation of qualification testing into a hardware component or appliance may be done to reduce the adverse impact on performance. However, using a special component may incur additional costs associated with purchasing the components. Additionally, such components may be vendor specific for use with a particular data storage system and operate in accordance with a fixed set of conditions and tests associated with a particular database. In contrast, the techniques described herein are flexible and may be used with a variety of different boundary conditions and record sizes and may be performed using components included in the data storage system.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for processing a data operation comprising:
receiving, at a data storage system, a data operation requesting a modification of data stored on a data storage volume in the data storage system; and
prior to performing said data operation modifying data stored on one or more disks of the data storage volume, performing a data qualification test to determine whether said data operation is valid, said performing a data qualification test including: obtaining a first address representing a starting address on the data storage volume for the data operation;
performing a calculation representing a boundary condition of the starting address on the data storage volume for the data operation; and determining, based on said calculation, whether said data operation has a starting address which is properly aligned; and
determining, in accordance with said calculation and a flag setting, whether to perform said data operation, said flag setting indicating whether to perform said data operation even if said data qualification test fails;
wherein said write operation is issued by a database application executing on the host;
wherein said data operation is a write operation directed to a logical device, said logical device including one or more extents of data of the database, each of said extents beginning at a second address on the logical device, each of said extents including one or more records of a record size, said calculation being represented as the remainder obtained when a first quantity, (first address−second address), is divided by the record size.

2. The method of claim 1, further comprising:
performing said data operation if said data operation has a starting address which is properly aligned.

3. The method of claim 1, wherein said data operation is performed if said data operation is in accordance with one or more criteria, said one or more criteria including proper alignment of said starting address of said data operation.

4. The method of claim 1, wherein said data operation is a write operation issued by a host.

5. The method of claim 4, wherein said performing and said determining are performed by a component included in the data storage system receiving said data operation from said host upon receipt of said data operation.

6. The method of claim 5, wherein if said remainder is zero, said data operation is determined to have a starting address which is properly aligned, and the method further comprising: performing said data operation.

7. The method of claim 5, wherein if said remainder is non-zero, said data operation is determined to have a starting address which is not properly aligned, and the method further comprising: determining whether to perform said data operation in accordance with said flag setting and said remainder; and generating an error condition.

8. The method of claim 7, wherein said flag setting indicates that said data operation should not proceed when said remainder is non-zero.

9. The method of claim 7, wherein said error condition is reported to said database application.

10. The method of claim 5, wherein said second address and said record size are stored in an extent table associated with the logical device, said extent table being stored in the data storage system.

11. A computer readable medium comprising code thereon for processing a data operation, the computer readable medium comprising code stored thereon that:
receives, at a data storage system, a data operation requesting a modification of data stored on a data storage volume in the data storage system; and
prior to performing said data operation modifying data stored on one or more disks of the data storage volume, performs a data qualification test to determine whether said data operation is valid, said code that performs a data qualification test including code that:
obtains a first address representing a starting address on the data storage volume for the data operation;
performs a calculation representing a boundary condition of the starting address on the data storage volume for the data operation; and
determines, based on said calculation, whether said data operation has a starting address which is properly aligned; and
determines, in accordance with said calculation and a flag setting, whether to perform said data operation, said flag setting indicating whether to perform said data operation even if said data qualification test fails;

wherein said write operation is issued by a database application executing on a host;

wherein said data operation is a write operation directed to a logical device, said logical device including one or more extents of data of the database, each of said extents beginning at a second address on the logical device, each of said extents including one or more records of a record size, said calculation being represented as the remainder obtained when a first quantity, obtained by subtracting the second address from the first address, is divided by the record size.

12. The computer readable medium of claim 11, further comprising code that:
performs said data operation if said data operation has a starting address which is properly aligned.

13. The computer readable medium of claim 11, wherein said data operation is performed if said data operation is in accordance with one or more criteria, said one or more criteria including proper alignment of said starting address of said data operation.

14. The computer readable medium of claim 13, wherein said performing and said determining are performed by a component included in the data storage system receiving said data operation from said host upon receipt of said data operation.

15. The computer readable medium of claim 14, wherein said second address and said record size are stored in an extent table associated with the logical device, said extent table being stored in the data storage system.

16. A data storage system comprising:
a first component in communication with a host, the first component including a processor and comprising code stored on a computer readable medium that:
receives a data operation requesting a modification of data stored in a database included in the data storage system;
obtains a first address representing a starting address of the data operation;
performs a calculation representing a boundary condition of the starting address of the data operation;
determines, based on said calculation, whether said data operation has a starting address which is properly aligned; and
determines, in accordance with said calculation and a flag setting, whether to perform said data operation, wherein a determination whether said data operation has a starting address which is properly aligned and a determination, in accordance with the calculation and the flag setting, whether to perform said data operation are performed as part of a data qualification test to determine whether said data operation is valid prior to performing said data operation modifying data stored on one or more storage devices of the data storage system, said flag setting indicating whether to perform said operation even if said data qualification test fails; and
global memory used by said first component and other components in the data storage system, said global memory including an extent table of one or more extent entries, each of said entries being associated with an extent of data of the database, said extent table being associated with a logical device to which said data operation is directed, said logical device including one or more extents of data of the database, wherein each of said one or more extents begins at a second address on the logical device and each of said one or more extents includes one or more records of a record size, said record size and said second address being included in said extent table and obtained therefrom and used in performing said calculation.

* * * * *